United States Patent
Parnis et al.

(10) Patent No.: US 7,823,967 B2
(45) Date of Patent: Nov. 2, 2010

(54) HEATER SYSTEM FOR AN AIRCRAFT SEAT

(75) Inventors: William R. Parnis, Livonia, MI (US);
Corey S. Cassavant, Milwaukee, WI
(US); Thomas A. Stuef, Troy, MI (US)

(73) Assignees: EMTEQ, Inc., New Berlin, WI (US);
Check Corporation, Troy, MI (US)

( * ) Notice: Subject to any disclaimer, the term of this patent is extended or adjusted under 35 U.S.C. 154(b) by 362 days.

(21) Appl. No.: 12/054,071

(22) Filed: Mar. 24, 2008

(65) Prior Publication Data

US 2008/0238159 A1 Oct. 2, 2008

Related U.S. Application Data

(60) Provisional application No. 60/896,944, filed on Mar. 26, 2007.

(51) Int. Cl.
A47C 7/74 (2006.01)
(52) U.S. Cl. .................. 297/180.12; 297/180.1
(58) Field of Classification Search .............. 297/180.1, 297/180.11, 180.12, 180.13, 180.14, 180.15, 297/180.16
See application file for complete search history.

(56) References Cited

U.S. PATENT DOCUMENTS

| | | | | |
|---|---|---|---|---|
| 4,175,297 A * | 11/1979 | Robbins et al. | ..... | 297/180.11 X |
| 4,966,145 A * | 10/1990 | Kikumoto et al. | ... | 297/180.15 X |
| 5,921,314 A * | 7/1999 | Schuller et al. | ....... | 297/180.1 X |
| 6,273,810 B1 * | 8/2001 | Rhodes et al. | ...... | 297/180.13 X |
| 6,489,595 B1 | 12/2002 | Check et al. | | |
| 6,619,736 B2 * | 9/2003 | Stowe et al. | ........... | 297/180.14 |
| 6,657,170 B2 * | 12/2003 | Clothier | .............. | 297/180.12 X |
| 6,664,520 B2 * | 12/2003 | Clothier | .............. | 297/180.12 X |
| 6,676,207 B2 * | 1/2004 | Rauh et al. | ............. | 297/180.14 |
| 6,722,148 B2 * | 4/2004 | Aoki et al. | .......... | 297/180.13 X |
| 6,822,204 B2 * | 11/2004 | Clothier | .............. | 297/180.11 X |
| 7,317,176 B2 * | 1/2008 | Boucher | ............. | 297/180.12 X |
| 7,467,823 B2 * | 12/2008 | Hartwich | ............... | 297/180.14 |
| 7,477,969 B2 * | 1/2009 | Panic | .................. | 297/180.1 X |
| 2001/0028185 A1 * | 10/2001 | Stowe et al. | ........... | 297/180.13 |
| 2002/0057005 A1 * | 5/2002 | Bargheer et al. | ....... | 297/180.13 |
| 2002/0105213 A1 * | 8/2002 | Rauh et al. | ............. | 297/180.14 |

(Continued)

OTHER PUBLICATIONS

Yukon XL Owners Manual, pages Cover, ii and 1-5, General Motors Corporation 2002.

*Primary Examiner*—Rodney B White
(74) *Attorney, Agent, or Firm*—Quarles & Brady LLP; George E. Haas

(57) ABSTRACT

A heater system for an aircraft seat includes a first heater pad secured to the bottom seat cushion and a second heater pad secured to the back seat cushion, with both pads being under an upholstery cover. The first and second heater pads each has a body of an open cell foam material that is self flame extinguishing, and an electric resistance wire embedded in a winding pattern within the body. A control module applies a variable electric current to the electric resistance wire in each of the first and second heater pads. Preferably only the second heater pad for the back seat cushion can be activated or both the first and second heater pads can be activated. A pushbutton switch module allows the seat occupant step the control module through a sequence of different heating levels.

44 Claims, 2 Drawing Sheets

U.S. PATENT DOCUMENTS

| | | | |
|---|---|---|---|
| 2004/0070236 A1* | 4/2004 | Brennan et al. | 297/180.13 |
| 2005/0275253 A1* | 12/2005 | Priebe | 297/180.14 |
| 2006/0175877 A1* | 8/2006 | Alionte et al. | 297/180.14 |
| 2006/0208549 A1* | 9/2006 | Hancock et al. | 297/342 |
| 2006/0244289 A1* | 11/2006 | Bedro | 297/180.1 |
| 2007/0013213 A1* | 1/2007 | Axinte et al. | 297/180.12 |
| 2008/0073947 A1* | 3/2008 | Hagler-Gray et al. | 297/180.14 |
| 2008/0168787 A1* | 7/2008 | Kameyama | 297/180.1 X |
| 2009/0051196 A1* | 2/2009 | Ishii et al. | 297/180.12 |
| 2010/0022926 A1* | 1/2010 | Kramer et al. | 297/180.1 X |

* cited by examiner

HEATER SYSTEM FOR AN AIRCRAFT SEAT

CROSS-REFERENCE TO RELATED APPLICATIONS

This application claims benefit of U.S. Provisional Patent Application No. 60/896,944 filed on Mar. 26, 2007.

STATEMENT REGARDING FEDERALLY SPONSORED RESEARCH OR DEVELOPMENT

Not Applicable

BACKGROUND OF THE INVENTION

1. Field of the Invention The present invention relates to heaters for seats, and more particularly to heater systems for aircraft seats.

2. Description of the Related Art

Between flights, aircraft frequently sit outdoors for prolonged periods of time, such as overnight. During such periods in winter, the temperature of the aircraft cabin decreases well below levels that are considered comfortable to passengers. Although the cabin usually is heated to room temperature before the passengers board, the seats often do not reach a comfortable temperature by boarding time. Seats on executive aircraft often are covered in leather, which is well known for being uncomfortable when cold. In addition, the application of heat to the lumbar region of the seat is useful for relieving back pain that may occur on long flights. Therefore, it is desirable to provide a heating mechanism in the aircraft passenger seats.

Unlike other types of vehicles, it is desirable that the interior of an aircraft be fabricated of materials that are flame resistant to provide time for the passengers to escape the aircraft cabin in the event of a fire upon landing. Electrical systems also must be very robust and have safeguards to avoid a fire hazard should a malfunction occur, because unlike an automobile, passengers may not be able to quickly exit an aircraft during a fire. It is further desired that electrical systems for passenger comfort related devices and amenities can be deactivated in an emergency so that such non-essential electrical loads do not adversely affect flight critical instruments and controls. Therefore, aircraft seat heaters have different design requirements than seats in other vehicles.

Incorporating seat heaters into aircraft seats presents additional challenges that do not exist with automobile seat heaters. For example, the seat bottom cushion of an aircraft seat may be removable for use as a floatation device after an emergency water landing. That removability can not be impeded by the seat heating system. Also, automobiles have a 12 volt direct current (VDC) electrical system, whereas aircraft typically have a 28 VDC system. In the event of a low resistance short circuit that does not draw high enough current to trip the circuit breaker, the greater voltage could result in sufficient power being delivered to ignite material adjacent the site of the short. Lightning frequently strikes aircraft and damage electronic devices Therefore many factors have to be considered when providing an aircraft seat heater system that do not have to be considered for automobile seat heaters.

SUMMARY OF THE INVENTION

In one implementation of a heater system provided for a seat in an aircraft, the seat has a bottom cushion and a back cushion, both having an upholstery cover. The heater system includes a first heater pad integrated into the bottom cushion under the upholstery cover, and a second heater pad integrated into the back cushion under the upholstery cover. Each of the first and second heater pads comprises a body of a material that is self flame extinguishing, and an electric resistance wire carried by the body.

Preferably, each heater pad is formed by a carrier of open cell foam material with a surface on which the electric resistance wire is arranged in a pattern. Although various patterns may be used, in one form, the electric resistance wire is arranged in a plurality of rows, each having a serpentine or winding pattern, for example. An outer foam layer may be adhered to the surface of the carrier to embed the electric resistance wire with in the heater pad body.

A control module is connected to the first and second heater pads to variably apply electric current to the electric resistance wires therein. A switch module is connected to the control module and is operable by an occupant of the seat to adjust application of electric current. In the preferred embodiment, the switch module includes a first switch, for controlling the control module to activate only the second heater pad, and a second switch, for controlling the control module to activate both the first and second heater pads. For example, each of the first and second switches is a pushbutton switch, and the control module responds to each activation of the pushbutton switch by stepping through a cyclical sequence of operating states comprising an off state and a plurality of different temperature states.

Other contemplated features that may be provided include several safety and convenience features not found in automobile seat heating systems.

DETAILED DESCRIPTION OF THE INVENTION

Figure 1:
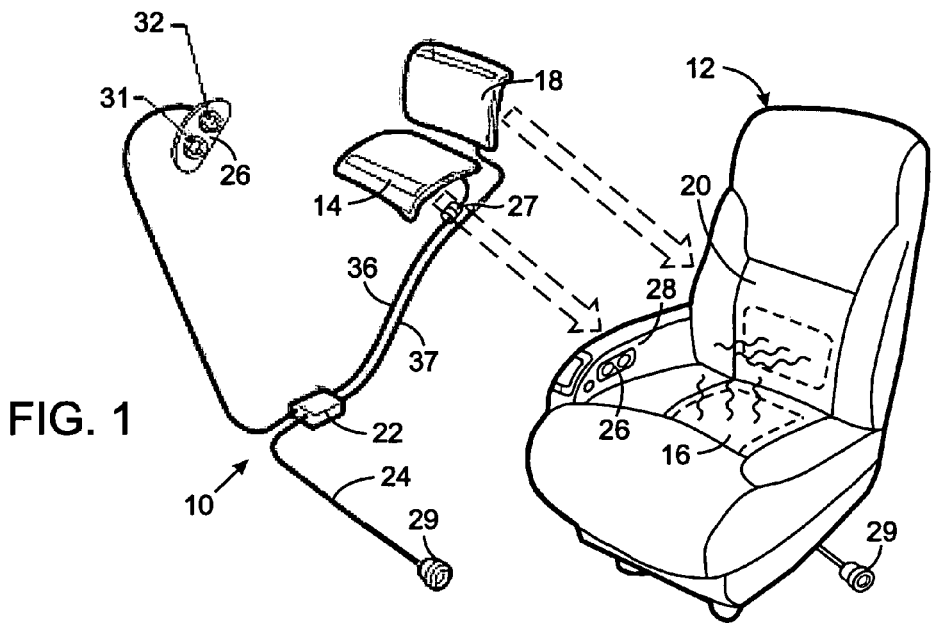
FIG. 1 depicts one implementation of the heater system for incorporation into an aircraft seat.

With initial reference to FIG. 1, one implementation of a seat heater system 10 for an aircraft passenger seat 12 comprises a first heater pad 14 for the seat bottom cushion 16 and a second heater pad 18 for the seat back cushion 20. The first and second heater pads 14 and 18 receive direct current (DC) power from a control module 22, that is beneath the seat and connected by a power cable 24 to the electrical system of the aircraft. Alternatively, when two or more seats are adjacent each other, a single control module can govern operation of the heater pads in those seats. The amount of electricity applied to each of the heater pads 14 and 18 by the control module 22, and thus the level of heat, is determined in response to activation of a switch module 26 located in an arm rest 28 of the passenger seat 12. The control module 22 cycles the first and second heater pads 14 and 18 on and off at different intervals depending on the level of heat desired by the seat occupant. Circuitry in the control module 22 monitors the voltage and current levels and terminates heater operation in the event of an abnormal condition. Of course, each seat may have more than two heater pads, or only one heater pad with that heater pad disposed adjacent to either the seat back, seat cushion, or both.

The control module 22 is connected by cable 36 to the first heater pad 14 and by cable 37 to the second heater pad 18 to control application of electrical current to the heater pads 14, 18. It is common for the seat bottom cushion 16 in aircraft to be useable as a floatation device in the event of an emergency water landing. To accommodate that use, a first non-locking, quick-disconnect connector 27 is provided in cable 36 near the seat bottom cushion 16, so that when a passenger pulls out the seat bottom cushion in an emergency that cushion is automatically disconnected from the remainder of the cable 36. This electrical disconnection does not require any separate action or intervention by the passenger or the passenger touching the connector 27 or cable 36. A similar second non-locking, quick-disconnect connector 29 is provided in the power cable 24 to the seat. If upon removing the passenger seat 12 from the floor of the aircraft, a maintenance technician fails to disconnect that power cable 24, the power cable will automatically separate from the electrical wiring in the aircraft without damaging the heater system 10 or the aircraft wiring.

Figure 2:
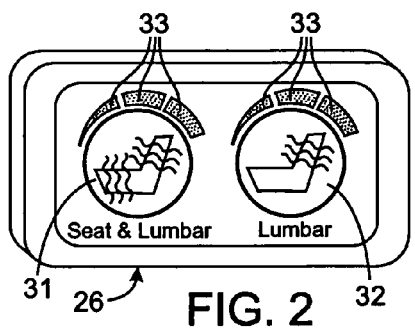
FIG. 2 illustrates a seat occupant control panel of the heater system.

The switch module 26 for the seat occupant is shown in detail in FIG. 2 and comprises a pair of pushbutton switches 31 and 32 that, when depressed by the seat occupant, signal the control module 22 indicating the level of heat desired. The first pushbutton switch 31 controls the application of electricity to both of the first and second heater pads 14 and 18 in unison, whereas the second pushbutton switch 32 controls only the second heater pad located in the lumbar portion of the seat back cushion 20. Pressing one of the switches repeatedly cycles the application of electricity to the respective heat pad or pads between off, low, medium, and high heat states. That is, the control module 22 responds to each activation of the switch by changing the amount of electricity applied to the associated heater pad or pads in a step-wise cyclical sequence for those four states. The control module 22 may change the amount of electricity applied to the heater pad(s) in any suitable manner, such as by pulse width modulation, varying voltage, or by cycling (turning on and off) the electricity at a desired rate which may be set or adjusted in response to, for example, the temperature of the pad. Three light emitting diodes 33 are associated with each of the pushbutton switches 31 and 32 and illuminate to indicate which of the three heat levels has been selected, thereby providing a visual feedback to the seat occupant as to the degree of heating that is active. The control module 22 also flashes the LED's 33 repeatedly as an indication of a problem being detected in the heater system 10.

Figure 3:
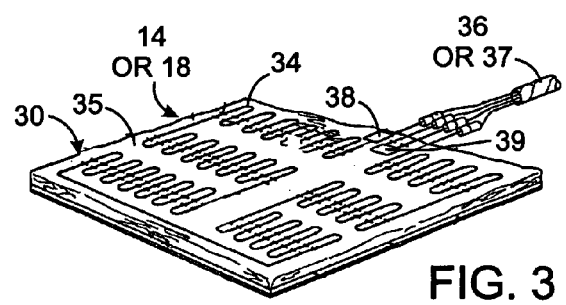
FIG. 3 is an isometric view of a heater pad for the heater system.

With reference to FIG. 3, each of the first and second heater pads 14 and 18 has a body that may include a generally rectangular foam carrier 30 that, in one implementation, is in the form of a net-like, foam with a network of open cells throughout. The carrier 30 may have a shape other than rectangular in order to conform to the shape and contour of the seat. One major surface 35 of the carrier 30 supports an electric resistance wire 34 that extends over most of that carrier surface and is arranged in a plurality of rows, each having a winding or serpentine pattern. The electric resistance wire 34 may be carried by, such as by being embedded into, the foam carrier, attached thereto by an adhesive or otherwise carried by the body. The two ends of the electric resistance wire 34 are connected to conductors of a multi-conductor cable 36 or 37 that extends to the control module 22.

A normally closed, thermostatic switch 38 carried by, such as being is bonded to the major surface 35 of the carrier 30 and couples one end of the electric resistance wire 34 to the positive conductor of the cable 36 that carries direct current. The other end of the electric resistance wire 34 is directly connected to the negative conductor that is coupled to electrical ground. The thermostatic switch 38 has a bimetallic element that causes the switch to open when the temperature of the heater pad 14 or 18 rises to a potentially uncomfortable level. The thermostatic switch 38 also opens if an excessively high electric current flows through it. In that case, either the thermostatic switch is heated to a temperature at which the bimetallic element opens the switch contacts or the high temperature of the surrounding seat material causes the switch to open. This prevents a low resistance short circuit in the cushion from drawing enough current to ignite material adjacent the site of the short.

A temperature sensor 39 also is attached to the major surface 35 of the carrier 30 to sense the temperature of the heater pad 14 or 18. The temperature sensor 39 is connected to another pair of conductors in the cable 36 to provide a temperature indication signal to the control module 22. The control module 22 responds to that temperature indication signal by determining the amount of time that the resistance wire 34 is energized to provide substantially uniform heat to the occupant of the seat 12 at the desired level set by the switch module 26. The response of the control module 22 to the temperature sensor 39 also prevents the heater pad 14 or 18 from overheating. The maximum temperature at which the control module 22 allows the pads to reach is lower that the threshold temperature at which the thermostatic switch 38 opens. Therefore, the thermostatic switch 38 acts as a non-electronic safety backup to the control module 22.

Figure 4:
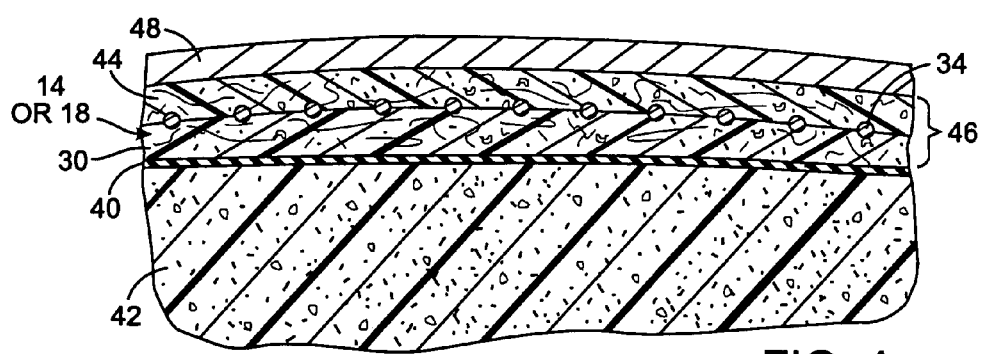
FIG. 4 is a cross section through part of the seat in FIG. 1 showing placement of the heater pad.

With reference to FIG. 4, the heater pad 14 or 18 is secured by an adhesive layer 40 to the surface of the primary foam cushion 42 of the respective seat bottom or back cushion 16 or 20. An outer foam layer 44 is placed over the heater pad 14 or 18 to isolate the occupant from being able to feel the pattern of the electric resistance wire 34. The carrier 30 and the outer foam layer 44 form a body 46 of the respective heater pad 14 or 18. Then an upholstery cover 48 is applied over that outer foam layer 44. The upholstery cover 48 can be any of several materials commonly used in aircraft seats, such as leather, vinyl, and fabric. The foam of the carrier 30 and the outer foam layer 44 are formed by a self flame extinguishing material, meaning that the foam does not continue to emit a flame for more than substantially 15 seconds after removal of an external flame source.

Alternatively, the carrier 30 and outer foam layer 44 of both the first and second heater pads 14 and 18 could be formed as a single contiguous body 46 of self flame extinguishing open cell foam with the resistance wire 34 embedded therein between the surfaces in contact with the primary foam cushion 42 and the upholstery cover 48. In this embodiment, the safety thermostatic switch 38 and the temperature sensor 39 also could be embedded in the heater pad foam. As a further alternative, the heater pad 14 or 18 can be molded directly into the primary foam cushion 42.

Figure 5:
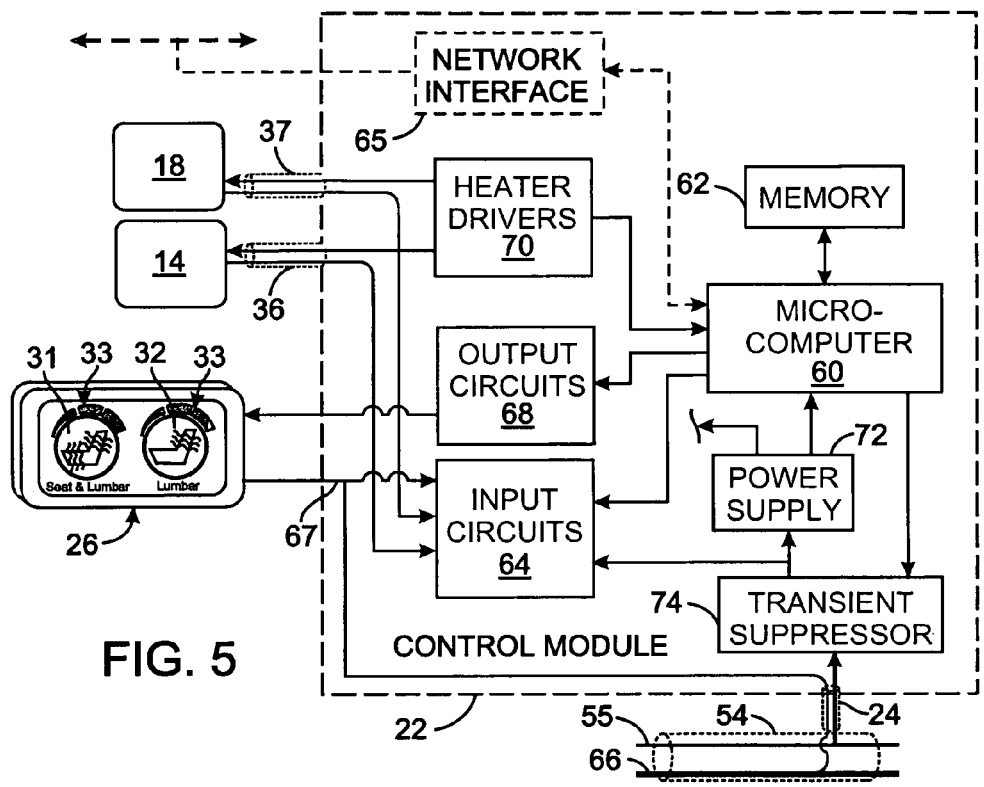
FIG. 5 is a schematic block diagram of a control module of the heater system.

Referring to FIG. 5, the control module 22 has a microcomputer 60 and a memory 62 that stores a software program and data for controlling operation of the seat heater system 10. The microcomputer 60 is connected to a set of input circuits 64 that receive signals from the two pushbutton switches 31 and 32 on the switch module 26 and signals from the temperature sensor 39 in each heater pad 14 and 18. Each time one of the pushbutton switches 31 or 32 is pressed a pulse is sent via the input circuits 64 to the microcomputer 60. The microcomputer 60 responds to each pulse by cycling either one or both of the first and second heater pads 14 and 18, as designated, through a sequence of off, low, medium, and high heat states. The wires from the pushbutton switches 31 and 32 also may be connected to conductors in a control cable 66 that extends through a wiring harness 54 to a control panel 57 of a conventional cabin management system in the aircraft 50 (see FIG. 6). A set of output circuits 68 also is coupled to the microcomputer 60 and conveys activation signals to the light emitting diodes 33 on the switch module 26. A pair of heater drivers 70 control application of electric current to the first and second heater pads 14 and 18 under the supervision of the microcomputer 60. The program for the microcomputer 60 can include one of more software implemented timers to limit the length of time that the first and second heater pads 14 and 18 can be active. This prevents the heater pads in vacant seats from being left turned on indefinitely. As noted previously, a single control module 22 may govern the operation of the heater pads in adjacent seats in the aircraft, in which case the input circuits 64, the output circuits 68, and the heater drivers 70 would be increased to interface with the switch modules and heater pads in a plurality of seats.

An internal power supply 72 provides electrical power to the components of the control module 22, using electricity received through the power cable 24 from a supply bus 55 in the wiring harness 54 running throughout the aircraft. A transient suppressor 74 shields the control module 22 from power surges and high transient voltage spikes from the power cable 24, thereby preventing the excessively high transient voltage from damaging components of the control module 22. Similar transient suppression devices can be provided on the other external inputs and outputs of the control module 22

Figure 6:
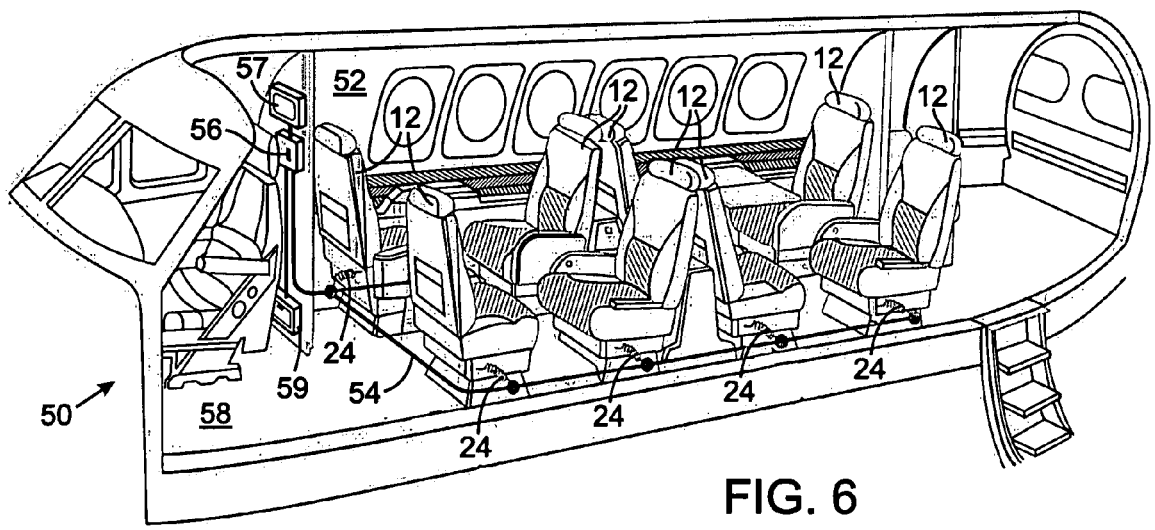
FIG. 6 is a cutaway view of an aircraft illustrating the electrical system that supplies power to the heaters in a plurality of seats.

With reference to FIG. 6, the typical aircraft 50 has a plurality of passenger seats 12, each having the first and second heater pads 14 and 18. As used herein, a "passenger seat" is a seat in which a person sits in the passenger cabin 52 of the aircraft, as opposed to a seat for a member of the flight crew, such as the pilot or co-pilot in the cockpit 58 for example. The power cable 24 for each passenger seat is connected to the wiring harness 54 that extends through the aircraft passenger cabin 52, thereby supplying electricity to all the heater control modules 22 located beneath the passenger seats 12. Alternatively, when two or more passenger seats are adjacent each other, e.g. located on the same side of the aisle, a single control module can govern operation of the heater pads in those seats.

The wiring harness 54 is routed to an electrical distribution panel 59 where the wiring harness connects to the non-essential power bus of the aircraft 50. The non-essential power bus supplies electricity to components that are not required for the aircraft to fly, such as entertainment apparatus, galley equipment, and environmental systems. In the event of an electrical problem within large commercial aircraft, the non-essential power bus is automatically disconnected from the sources of electricity to prevent unnecessary devices from draining power from flight critical instruments and controls. Smaller aircraft usually do not have a separate non-essential power bus, in which case, a load shedding switch 56 is located, remote from the passenger seats, in the cockpit 58 between the electrical distribution panel 59 and wiring harness 54 within easy reach of the flight crew. This arrangement enables the flight crew to turn off all the seat heater systems 10 remotely with a single switch. As used herein, the phase "remote from the seat" means the referenced component is beyond arms reach of an occupant of the seat.

In both types of electrical systems, the electrical circuit for the seat heaters is connected to a separate dedicated circuit breaker in the electrical distribution panel 59. Thus, in the event of an electrical malfunction within the electrical system for the seat heaters, that circuit breaker will trip without affecting any other systems on the aircraft. Nevertheless in many aircraft the circuit breakers in the electrical distribution panel 59 are relatively in accessible to the flight crew, therefore a more easily accessible load shedding switch 56 is located in the cockpit 58.

Also located in the cockpit 58 (or in the passenger cabin) is a control panel 57 of a conventional cabin management system that operates lighting, an environmental system, and entertainment equipment in the aircraft. In addition, the control panel 57 is located remote from the seats and controls the seat heater system 10 in individual seats 12, as well as to turn on all those seat heater systems simultaneously, for example to warm the seats prior to passengers entering the aircraft. The control panel 57 has a touch screen on which a floor plan of the passenger cabin or simply a list of the seats is displayed, when the seat heater control function is selected. By touching one or more seats on the floor plan or on the list, those seats can be selected by a flight crew member. Alternatively, a turn on all seat heaters icon can be touched. Then by touching an activation icon on the control panel screen, a low voltage pulse is sent via the control cable 66 within the wiring harness 54 to the control modules 22 for the selected passenger seats 12, see FIG. 5. Within each of those control modules 22, the pulse is applied to the conductors 67 that link the switch module 26 to the input circuits 64. Thus pulse replicates a control pulse that is produced by activation of a pushbutton switch 31 or 32 on the switch module 26 and the microcomputer 60 responds in the same manner by activating one or both of the first and second heater pads 14 and 18, depending on which conductor received the pulse.

After the passenger seats 12 have warmed sufficiently, a member of the flight crew can turn off all the seats simultaneously via the control panel 57. Alternatively, the control panel may be programmed automatically to turn off all the seat heater systems 10 after a predefined period of time in the pre-passenger boarding heating mode. Instead of using the control panel 57 of the cabin management system, a separate control panel can be provided for the seat heater systems 10.

As an alternative to the control cable 66, the control panel 57 may be connected to all the control modules 22 via a conventional computer network 63 shown in FIG. 5, in which case each control module 22 has an optional network interface 65.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A heater system for a seat in an aircraft wherein the seat has a bottom cushion and a back cushion both having an upholstery cover, the heater system comprising:
   a first heater pad adapted to be integrated into at least one of the bottom cushion and the back cushion under the upholstery cover, wherein the first heater pad comprises a body of a material that is self flame extinguishing, and an electric resistance wire carried by the body;
   a control module for controlling application of electric current to the electric resistance wire in the first heater pad; and a switch module adapted to be integrated into the seat and being connected to the control module for operation by an occupant of the seat to adjust functioning of the control module.

2. The heater system as recited in claim 1 wherein the electric resistance wire is arranged in a serpentine pattern abutting the body of the first heater pad.

3. The heater system as recited in claim 1 wherein the electric resistance wire is arranged in a plurality of rows, each having a serpentine pattern, abutting the body of the first heater pad.

4. The heater system as recited in claim 1 wherein the body of the first heater pad comprises a carrier of open cell foam material with a surface on which the electric resistance wire is arranged in a pattern; and an outer foam layer adhered to the surface of the carrier.

5. The heater system as recited in claim 1 wherein the first heater pad further comprises a temperature sensor coupled to the control module.

6. The heater system as recited in claim 1 wherein the first heater pad further comprises a thermostatic switch coupling the electric resistance wire to the control module.

7. The heater system as recited in claim 1 wherein the a first heater pad is adapted to be integrated into the bottom cushion; and further comprising a second heater pad integrated into the back cushion under the upholstery cover, wherein the second heater pad comprises another body of a material that is self flame extinguishing, and another electric resistance wire carried by the body.

8. The heater system as recited in claim 7 wherein the first heater pad is adapted to be secured to a surface of the bottom cushion; and the second heater pad is adapted to be secured to a surface of the back cushion.

9. The heater system as recited in claim 1 further comprising a load shedding switch adapted to be located in a cockpit of the aircraft and connected between a circuit breaker and the control module.

10. The heater system as recited in claim 1 further comprising a control device adapted to be located remotely from the seat and to which the control module responds by turning on the first heater pad regardless of a state of the switch module.

11. A heater system for a seat in an aircraft, wherein the seat has a bottom cushion and a back cushion both having an upholstery cover, the heater system comprising:
 a first heater pad is adapted to be integrated into one of the bottom cushion and the back cushion under the upholstery cover, wherein the first heater pad comprises a first body and a first electric resistance wire carried by the first body;
 a control module for controlling application of electric current to the electric resistance wire in the first heater pad;
 a thermostatic switch in thermal contact with the first heater pad and coupling the first electric resistance wire to the control module; and
 a switch module adapted to be adjacent to the seat and being connected to the control module for operation by an occupant of the seat to adjust functioning of the control module.

12. The heater system as recited in claim 11 wherein the first heater pad further comprises a temperature sensor coupled to the control module.

13. The heater system as recited in claim 11 further comprising a transient suppressor for mitigating effects that power surges and voltage spikes in an electrical supply line in the aircraft have on the heater system.

14. The heater system as recited in claim 11 wherein the first heater pad is adapted to be integrated into the bottom cushion; and further comprising an electrical connector adapted to be located adjacent the bottom cushion and coupling the first heater pad to the control module; wherein the electrical connector automatically disconnects the first heater pad from the control module upon the bottom cushion being removed from the seat.

15. The heater system as recited in claim 11 further comprising an electrical connector adapted to be located adjacent to the seat and adapted to couple the heater system to electrical wiring in the aircraft, wherein the electrical connector automatically disconnects the heater system from the electrical wiring upon the seat being detached from a floor of the aircraft.

16. The heater system as recited in claim 11 further comprising a second heater pad adapted to be integrated into another one of the bottom cushion and the back cushion under the upholstery cover, wherein the second heater pad comprises a second body and a second electric resistance wire carried by the second body.

17. The heater system as recited in claim 16 wherein the switch module comprises a first switch for controlling the control module to activate only the first heater pad, and a second switch for controlling the control module to activate both the first and second heater pads.

18. The heater system as recited in claim 11 wherein the switch module comprises a pushbutton switch; and the control module responds to each activation of the pushbutton switch by stepping through a cyclical sequence of operating states comprising an off state and a plurality of different temperature states.

19. The heater system as recited in claim 18 wherein the switch module further comprises a plurality of light emitters that provide an indication of which one of the plurality of different temperature states is active.

20. The heater system as recited in claim 11 further comprising another heater pad and another switch module adapted to be mounted on an adjacent seat and connected to the control module.

21. The heater system as recited in claim 11 further comprising a load shedding switch adapted to be located in a cockpit of the aircraft and connected between a circuit breaker and the control module.

22. The heater system as recited in claim 11 further comprising a control device adapted to be located remotely from the seat and to which the control module responds by turning on the first heater pad regardless of a state of the switch module.

23. A heater system for a seat in an aircraft, wherein the seat has a bottom cushion and a back cushion both having an upholstery cover, the a heater system comprising:
 a heater pad adapted to be integrated into the bottom cushion under the upholstery cover, herein the heater pad comprises a body and a electric resistance wire carried by the body;
 a control module for controlling application of electric current to the electric resistance wire in the heater pad;
 an electrical connector adapted to be located adjacent the bottom cushion and coupling the heater pad to the control module, wherein the electrical connector automatically disconnects the heater pad from the control module upon the bottom cushion being removed from the seat; and a switch module adapted to be located adjacent to the seat and being connected to the control module for operation by an occupant of the seat to adjust functioning of the control module.

24. The heater system as recited in claim 23 further comprising an electrical connector adjacent to the seat and adapted to couple the heater system to electrical wiring in the aircraft; wherein the electrical connector automatically disconnects the heater system from the electrical wiring upon the seat being detached from a floor of the aircraft.

25. A heater system for a seat in an aircraft wherein the seat has a bottom cushion and a back cushion both having an upholstery cover, the heater system comprising:
 a heater pad adapted to be integrated into one of the bottom cushion and the back cushion under the upholstery cover, wherein the heater pad comprises a body and an electric resistance wire carried by the body;
 a control module for controlling application of electric current to the electric resistance wire in the heater pad;
 a switch module adapted to be located adjacent to the seat and being connected to the control module for operation by an occupant of the seat to adjust functioning of the control module; and
 a control device adapted to be located remotely from the seat and connected to the control module for turning on the first heater pad regardless of a state of the switch module.

26. The heater system as recited in claim 25 wherein the control device comprises a load shedding switch adapted to be connected between a circuit breaker and the control module.

27. The heater system as recited in claim 25 wherein the control device produces a signal to which the control module responds by turning on the heater pad.

28. The heater system as recited in claim 25 further comprising a thermostatic switch in thermal contact with the heater pad and coupling the electric resistance wire to the control module.

29. The heater system as recited in claim 25 wherein the heater pad further comprises a temperature sensor coupled to the control module.

30. A heater system for a plurality of seats in an aircraft, wherein each seat has a bottom cushion and a back cushion both having an upholstery cover, the heater system comprising:
 a plurality of heater pads, each adapted to be integrated into one of the bottom cushion and the back cushion under the upholstery cover of a different one of the plurality of seats, and comprising a body and a electric resistance wire carried by the body;
 a plurality of control modules, each for controlling application of electric current to the electric resistance wire in at least one of the plurality of heater pads;
 plurality of switch modules, each adapted to be located adjacent to a given one of the plurality of seats and connected to the control module for operation by an occupant of the given one seat to adjust operation of the control module; and
 a control device adapted to be located remotely from the plurality of seats and being connected to the plurality of control modules for turning on the plurality of heater pads regardless of a state of the plurality of switch modules.

31. The heater system as recited in claim 30 wherein the control device comprises a load shedding switch adapted to be connected between a circuit breaker and the plurality of control modules for disconnecting application of electric current to all control modules.

32. The heater system as recited in claim 30 wherein the control device produces a signal to which at least some of the plurality of control modules respond by turning on at least some of the plurality of heater pads.

33. The heater system as recited in claim 30 wherein each one of at least some of the plurality of control modules control application of electricity to heater pads for more than one seat.

34. A heater system for a seat in an aircraft, wherein the seat has a bottom cushion and a back cushion both having an upholstery cover, a heater system comprising:
 a first heater pad adapted to be integrated into the bottom cushion under the upholstery cover, and a second heater pad adapted to be integrated into the back cushion under the upholstery cover, wherein each of the first and second heater pads comprises a body of a foam material that is self flame extinguishing and an electric resistance wire embedded in a winding pattern within the body;
 a control module for variably applying electric current to the electric resistance wire in each of the first and second heater pads; and
 a switch module connected to the control module and operable by an occupant of the seat to adjust functioning of the control module, the switch module comprises a first switch for controlling application of electric current to only the first heater pad, and a second switch for controlling application of electric current both the first and second heater pads.

35. The heater system as recited in claim 34 wherein the switch module comprises a pushbutton switch; and the control module responds to each activation of the pushbutton switch by stepping through a cyclical sequence of operating states comprising an off state and a plurality of different temperature states.

36. The heater system as recited in claim 34 wherein the switch module further comprises a plurality of light emitters that provide an indication of which one of the plurality of different temperature states is active.

37. The heater system as recited in claim 34 wherein each of the first and second heater pads further comprises a thermostatic switch coupling the electric resistance wire to the control module.

38. The heater system as recited in claim 34 wherein each of the first and second heater pads further comprises a temperature sensor coupled to the control module.

39. The heater system as recited in claim 34 further comprising a control device adapted to be located remotely from the seat and to which the control module responds by turning on at least one of the first heater pad and the second heater pad regardless of a state of the switch module.

40. The heater system as recited in claim 34 further comprising an electrical connector adapted to be located adjacent the bottom cushion and coupling the first heater pad to the control module; wherein the electrical connector automatically disconnects the first heater pad from the control module upon the bottom cushion being removed from the seat.

41. The heater system as recited in claim 1 further comprising an electrical connector adapted to couple the heater system to electrical wiring in the aircraft, wherein the electrical connector automatically disconnects the heater system from the electrical wiring upon the seat being detached from the aircraft.

42. The heater system as recited in claim 25 further comprising an electrical connector adapted to couple the control module to electrical wiring in the aircraft, wherein the electrical connector automatically disconnects the control module from the electrical wiring upon the seat being detached from the aircraft.

43. The heater system as recited in claim 30 further comprising a plurality of electrical connectors, each adapted to couple one of the plurality of control modules to electrical wiring in the aircraft, wherein each electrical connector automatically disconnects the one control module from the electrical wiring upon the associated seat being detached from the aircraft.

44. The heater system as recited in claim 30 wherein the control device turns on the plurality of heater pads regardless of a state of the plurality of switch modules.

* * * * *